May 14, 1957    M. RASHEVSKY    2,792,513
LOCKING-KEYS FOR TURBINE-GENERATOR RETAINING RINGS
Filed May 5, 1954
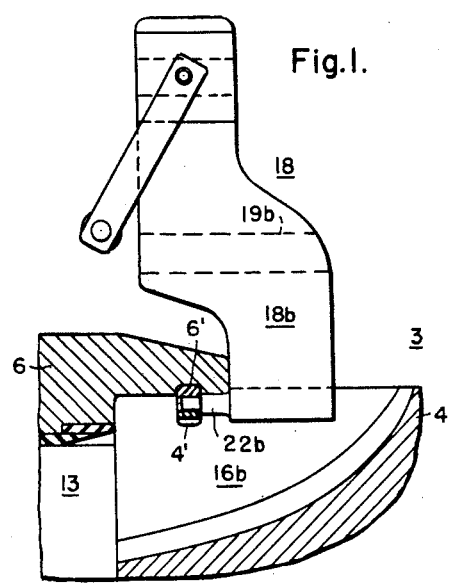
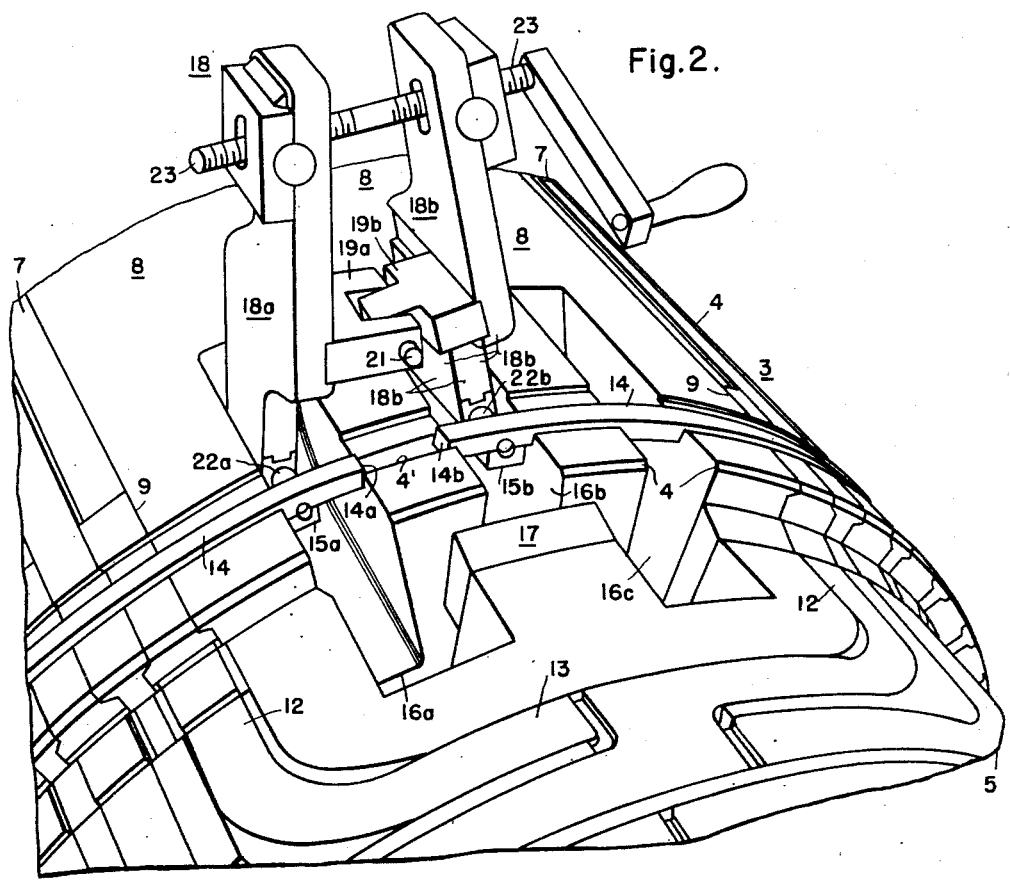

United States Patent Office 2,792,513
Patented May 14, 1957

2,792,513

LOCKING-KEYS FOR TURBINE-GENERATOR RETAINING RINGS

Michael Rashevsky, Pittsburgh, Pa., assignor to Westinghouse Electric Corporation, East Pittsburgh, Pa., a corporation of Pennsylvania Application May 5, 1954, Serial No. 427,731

8 Claims. (Cl. 310—270)

My invention relates to an open ring-shaped locking-key which is inserted between the retaining ring and the rotor-core of a turbine-generator, or, in general, between any two telescopically fitting parts of a two-part cylindrical member of any kind. In the field of turbine-generator retaining-rings, my invention is an improvement over the construction which is shown in the Vickers Patent 2,621,223, December 9, 1952, which is an improvement over the practices shown in the Hill Patent 2,318,074, May 4, 1943; the Rose Patent 1,890,340, December 6, 1932; and the Kilgore Patent 2,094,358, September 28, 1937.

The general object of my invention is to provide a new, strong, simple and inexpensive locking-ring, which provides a larger contact-area than is obtainable with the discrete locking-plungers of the Vickers patent, and which avoids the necessity for drilling and tapping a number of small radial holes in the retaining ring in order to radially compress the locking-ring by means of jack-screws, as in other locking means of the prior art. These previously used small tapped holes created stress-concentrations which were undesirable in the larger sizes of retaining rings, and these holes were also quite difficult to drill and tap in the non-magnetic steel material of which most of the larger retaining rings are made. My present invention provides a locking-device by means of which it is possible to contract the locking-ring or key by pulling together the ends of the ring.

An exemplary form of embodiment of my invention is shown in the accompanying drawing, wherein:

Figure 1 is a longitudinal sectional view of a portion of the rotor-member of a turbine generator, showing a tension-applying tool in place, for drawing together the nearly abutting ends of a ring-shaped locking-key for holding the retaining ring in its telescoped relation to the rotor-core; and Fig. 2 is a perspective view of the same.

In the drawing, I show a part of only the rotor-member 3 of a turbine-generator or other high-speed dynamo-electrical machine. The illustrated part of the rotor-member comprises a slotted cylindrical rotor-core or body 4, a rotor-winding 5, and one of the two-retaining rings 6 which extend beyond the respective ends of the rotor-core.

The slotted cylindrical rotor-core 4 is provided with slotted winding-carrying portions 7, alternating with pole portions 8. The winding-carrying portions 7 have axially extending winding-receiving slots 9. The pole portions 8 usually do not have axially extending slots which extend throughout the entire core-length.

The rotor-winding 5 is a direct-current field-winding, usually providing two poles in the commonest fields of application of my invention. This rotor-winding 5 has coil-side portions 12 which lie in the winding-receiving slots 9, and end-turn portions 13 which lie beyond the respective ends of the rotor-core.

The retaining rings 6 are for the purpose of withstanding the centrifugal forces of the end-turn portions 13 of the rotor-winding 5. One such retaining ring is provided at each end of the rotor-core 4. The inner end of each retaining ring 6 has a cylindrical bore which fits telescopically over its end of the rotor-core 4. The telescoped portions, which are the engaging surfaces of the telescoping parts 6 and 4, have opposite annular grooves or slots 6' and 4' which are complementary to form a substantially closed annular chamber. Preferably, the retaining-rings 6 are shrunk onto the rotor-core or body 4.

The opposite annular grooves 4' and 6' of the telescoped portions of the core 4 and the retaining ring 6, respectively, are lockingly engaged by a locking-key means, which is preferably a single-piece, open-ended, ring-shaped, locking-key 14, which fits within and between these opposite grooves 4' and 6' to retain the retaining ring 6 on its end of the rotor-core 4. This locking-key 14 is preferably resiliently biased toward an expanded position. It has one or more pairs of nearly abutting ends 14a and 14b which, according to my present invention, are provided with laterally perforated enlargements 15a and 15b, or other means whereby said nearly abutting ends 14a and 14b may be drawn together, or pulled toward each other, so as to reduce the diameter of the locking-key to permit a disassembling of the parts. The groove 4' of the inner telescoping part 4 has sufficient depth to permit the locking-key 14 to be moved completely out of the groove 6' of the outer telescoping part 6, so as to permit this disassembly.

When my invention is applied to the means for locking the retaining ring on an end of the rotor-core of a turbine-generator, as shown in the drawing, it is desirable that the telescoped end of the rotor-core 4 shall have one or more peripheral radially and axially extending access-slots 16a and 16b in one of the pole portions 8 of said core. These access-slots need not, and usually do not, extend axially throughout the entire length of the rotor-core, but are cut on an incline, so as to be deepest at the end of the rotor-core 4, tapering up to nothing at a point further back from the end. It is necessary that the access-slot or slots shall extend in, axially, beyond the telescoping end of the retaining ring 6, so as to provide access for a tool for drawing together the nearly abutting ends 14a and 14b of the locking-key 14, in order to release the retaining ring 6 so that it may then be withdrawn axially from the rotor-core 4.

The particular machine which is shown in Fig. 2 is provided with an additional peripheral access-slot 16c in the same pole portion 8 of the rotor-core 4. The particular illustrated machine is a machine having inner-cooled windings, and the two similar slots 16a and 16c are used to provide for some ventilating gas to flow from underneath the end-turns 13 of the rotor-winding 5, directly to the airgap which surrounds the periphery of the rotor-core 4. My access-slot 16b is disposed between these two ventilating access-slots 16a and 16c, the middle slot 16b being usually blocked off, so that it does not serve as a ventilating slot, by reason of a Bakelite or other insulating member 17 which is used to separate the circumferentially extending portions of the end-turns 13 from the end of the rotor-core 4.

It is contemplated, within the scope of my invention, that any suitable means may be used, whereby the nearly abutting ends 14a and 14b of the locking-ring or key 14 may be drawn together for the purpose of reducing the outer diameter of said locking-ring or key 14, so as to clear the inner diameter of the telescoping part of the retaining ring 6, when it is necessary to remove the retaining ring for the purpose of servicing the rotor-windings. Any sort of wire-tightening or tension-applying tool 18, or lever, may be temporarily inserted through one or more of the access-slots 16a or 16b, for drawing together the ends 14a and 14b of the locking-key 14.

The drawing shows a preferred form of embodiment of my invention, in which the tension-applying tool 18 is a device which has two intermediately pivoted legs 18a and 18b, which are provided, at an intermediate point, with pivot-bosses 19a and 19b, which are pivotally joined at 21. This double-legged tension-applying tool 18 is adapted to stand radially in the access-slots 16a and 16b, and the bottom ends of the two legs 18a and 18b are provided with offset bottom portions or pins 22a and 22b, which extend under the telescoping end of the retaining ring 6, and which come into removable engagement with the perforated enlargements 15a and 15b of the two ends 14a and 14b of the locking-key 14. These two key-ends may then be drawn together by forcing the upper ends of the tool-legs 18a and 18b apart, as by means of a screw 23. It will be understood that the tool 18 is altogether removed from the rotor-member, before the rotor-member is assembled in the stator-member (not shown) of the turbine-generator.

While I have described my invention in the application for which it was primarily designed, I wish it to be understood that I am not altogether limited to this use or application of my invention, as I believe that it will find utility in other situations in which a member is provided with two cylindrical parts which fit telescopically together.

I claim as my invention:

1. A member having at least two cylindrical parts fitting telescopically together, the engaging surfaces of the two telescoping parts having opposite annular grooves which are complementary to form a substantially closed annular chamber, and a locking-key means fitting within and between said opposite grooves to retain said parts together, said locking-key means having one or more pairs of nearly abutting ends which are provided with means whereby said nearly abutting ends may be pulled toward each other so as to reduce the diameter of the locking-key to permit disassembly of the parts, the groove of the inner telescoping part having sufficient depth to permit the locking-key to be moved completely out of the groove of the outer telescoping part so as to permit said disassembly.

2. The combination including a cylindrical body-part, a ring-part which extends beyond one end of said cylindrical body-part, the inner end of said ring-part having a cylindrical bore which fits telescopically over said end of the cylindrical body-part, the engaging surfaces of the two telescoping parts having opposite annular grooves which are complementary to form a substantially closed annular chamber, and a locking-key means fitting within and between said opposite grooves to retain said parts together, said locking-key means having one or more pairs of nearly abutting ends which are provided with means whereby said nearly abutting ends may be pulled toward each other so as to reduce the diameter of the locking-key to permit disassembly of the parts, the groove of the inner telescoping part having sufficient depth to permit the locking-key to be moved completely out of the groove of the outer telescoping part so as to permit said disassembly, and the telescoped end of the inner part having one or more radially and axially extending access-slots which extend in, axially, beyond the outer telescoping part, for providing access for a tool for drawing together the nearly abutting ends of the locking-key, to release the telescoping parts so that they may be separated.

3. The combination including a cylindrical body-part, a ring-part which extends beyond one end of said cylindrical body-part, the inner end of said ring-part having a cylindrical bore which fits telescopically over said end of the cylindrical body-part, the engaging surfaces of the two telescoping parts having opposite annular grooves which are complementary to form a substantially closed annular chamber, and a locking-key means fitting within and between said opposite grooves to retain said parts together, said locking-key means having one or more pairs of nearly abutting ends which are provided with tool-engageable means whereby said nearly abutting ends may be drawn together so as to reduce the diameter of the locking-key to permit disassembly of the parts, the telescoped end of the inner part having one or more pairs of peripheral radially and axially extending access-slots which extend in, axially, beyond the outer telescoping part, for providing access for the two legs of a double-legged tension-applying tool for drawing said ends together, to release the telescoping parts so that they may be separated, the groove of the inner telescoping part having sufficient depth to permit the locking-key to be moved completely out of the groove of the outer telescoping part so as to permit said separation of the telescoping parts.

4. The invention as defined in claim 3, in combination with one or more removable double-legged tension-applying tools, adapted to stand radially in said access-slots, and having offset bottom ends for removably engaging said tool-engageable means on the nearly abutting ends of the locking-key.

5. The combination including a cylindrical body-part, a ring-part which extends beyond one end of said cylindrical body-part, the inner end of said ring-part having a cylindrical bore which fits telescopically over said end of the cylindrical body-part, the engaging surfaces of the two telescoping parts having opposite annular grooves which are complementary to form a substantially closed annular chamber, and an open ring-shaped locking-key fitting within and between said opposite grooves to retain said parts together, said locking-key being resiliently biased toward an expanded position, and having nearly abutting ends which are provided with means for accommodating a tool extending beyond the end of the outer telescoped part for applying a circumferential force on said locking-key, so as to pull said nearly abutting ends toward each other and thus reduce the diameter of the locking-key to permit disassembly of the parts, the groove of the inner telescoping part having sufficient depth to permit the locking-key to be moved completely out of the groove of the outer telescoping part so as to permit said disassembly, and the telescoped end of the inner part having one or more radially and axially extending access-slots which extend in, axially, beyond the outer telescoping part, for providing access for a tool for drawing together the nearly abutting ends of the locking-key to release the telescoping parts so that they may be separated.

6. A rotor-member for a high-speed dynamo-electric machine, comprising a slotted cylindrical rotor-core having slotted winding-carrying portions, alternating with pole portions, the winding-carrying portions having axially extending winding-receiving core-slots; a rotor-winding having coil-side portions lying in said winding-receiving core-slots, and end-turn portions lying beyond the respective ends of the rotor-core; a retaining ring for the end turns at at least one end of the rotor-winding, the inner end of said retaining ring fitting telescopically over its end of the rotor-core, the engaging surfaces of said telescoping ring and core having opposite annular grooves which are complementary to form a substantially closed annular chamber; and an open ring-shaped locking-key fitting within and between said opposite grooves to retain said retaining ring on its end of the rotor-core; said locking-key being resiliently biased toward an expanded position, and having nearly abutting ends which are provided with means whereby said nearly abutting ends may be drawn together so as to reduce the diameter of the locking-key to permit disassembly of the parts, the groove of the inner telescoping part having sufficient depth to permit the locking-key to be moved completely out of the groove of the outer telescoping part so as to permit said disassembly; the telescoped end of the rotor-core having one or more peripheral radially and axially extending access-slots in a pole portion of said core, said access-slot or slots extending in, axially, beyond the adjacent retaining ring, for providing access for a tool for drawing together the nearly abutting ends of the locking-key at that end of the rotor-core, to release the retaining ring so that it may then be withdrawn axially from the rotor-core.

7. A rotor-member for a high-speed dynamo-electric machine, comprising a slotted cylindrical rotor-core having slotted winding-carrying portions, alternating with pole portions, the winding-carrying portions having axially extending winding-receiving core-slots; a rotor-winding having coil-side portions lying in said winding-receiving core-slots, and end-turn portions lying beyond the respective ends of the rotor-core; a retaining ring for the end turns at at least one end of the rotor-winding, the inner end of said retaining ring fitting telescopically over its end of the rotor-core, the engaging surfaces of said telescoping ring and core having opposite annular grooves which are complementary to form a substantially closed annular chamber; and an open ring-shaped locking-key fitting within and between said opposite grooves to retain said retaining ring on its end of the rotor-core; said locking-key being resiliently biased toward an expanded position, and having nearly abutting ends which are provided with tool-engageable means whereby said nearly abutting ends may be drawn together so as to reduce the diameter of the locking-key to permit disassembly of the parts, the groove of the inner telescoping part having sufficient depth to permit the locking-key to be moved completely out of the groove of the outer telescoping part so as to permit said disassembly; the telescoped end of the rotor-core having two peripheral radially and axially extending access-slots in a pole portion of said core, one of said access-slots being adjacent to each of the nearly abutting ends of the locking-key at that end of the rotor-core, said access-slots extending in, axially, beyond the adjacent retaining ring, for providing access for the two legs of a double-legged tension-applying tool for drawing said ends together to release the retaining ring so that it may then be withdrawn axially from the rotor-core.

8. The invention as defined in claim 7, in combination with a removable double-legged tension-applying tool, adapted to stand radially in said access-slots, and having offset bottom ends for removably engaging said tool-engageable means on the nearly abutting ends of the locking-key.

References Cited in the file of this patent

UNITED STATES PATENTS

| | | |
|---|---|---|
| 738,503 | Waters | Sept. 8, 1903 |
| 1,890,340 | Rose | Dec. 6, 1932 |
| 2,350,651 | Taubert et al. | June 6, 1944 |
| 2,475,042 | McCloskey | July 5, 1949 |

OTHER REFERENCES

"Truarc" Catalog No. 4K–6 on "Retaining Rings" by Waldes Kohinoor, Inc., Long Island City, N. Y., 12 pages.